United States Patent
Jo et al.

(10) Patent No.: US 10,012,274 B2
(45) Date of Patent: Jul. 3, 2018

(54) PIN CLUTCH CONNECTION STRUCTURE OF ANTI-PANIC GEAR BOX

(71) Applicant: iRevo, Inc., Seoul (KR)

(72) Inventors: Sung Phil Jo, Seoul (KR); Dong Ho Paek, Seoul (KR)

(73) Assignee: IREVO, INC., Seoul (KR)

( * ) Notice: Subject to any disclaimer, the term of this patent is extended or adjusted under 35 U.S.C. 154(b) by 279 days.

(21) Appl. No.: 14/428,129

(22) PCT Filed: May 30, 2013

(86) PCT No.: PCT/KR2013/004746
§ 371 (c)(1),
(2) Date: Mar. 13, 2015

(87) PCT Pub. No.: WO2014/046371
PCT Pub. Date: Mar. 27, 2014

(65) Prior Publication Data
US 2015/0218851 A1 Aug. 6, 2015

(30) Foreign Application Priority Data

Sep. 18, 2012 (KR) .................. 10-2012-0103341
Jan. 14, 2013 (KR) .................. 10-2013-0003794

(51) Int. Cl.
*F16D 43/02* (2006.01)
*E05B 63/00* (2006.01)
(Continued)

(52) U.S. Cl.
CPC .......... *F16D 43/02* (2013.01); *E05B 47/0012* (2013.01); *E05B 63/0065* (2013.01);
(Continued)

(58) Field of Classification Search
CPC ............ E05B 47/068; E05B 2047/002; E05B 2047/0031; E05B 2047/0026;
(Continued)

(56) References Cited

U.S. PATENT DOCUMENTS 4,322,186 A * 3/1982 Boling ................ B23B 31/38
192/56.57
4,744,687 A * 5/1988 Nukaya ................ B41J 13/03
192/71

(Continued)

FOREIGN PATENT DOCUMENTS

KR 10-2000-0054365 9/2000
KR 20-0452407 2/2011
(Continued)

OTHER PUBLICATIONS

International Search Report for PCT/KR2013/004746, dated Sep. 25, 2013, 2 pages.

*Primary Examiner* — Victor L Macarthur
*Assistant Examiner* — Joseph H Brown
(74) *Attorney, Agent, or Firm* — Nixon & Vanderhye P.C.

(57) ABSTRACT

Disclosed is a pin clutch connection structure of an anti-panic gear box, wherein the transmission of rotation to a driving motor which is mounted on a gear box is blocked when rotational force is applied from the outside (manual opening and closing of a door lock), so as to prevent a driving circuit in the gear box from being damaged and to enable manual opening and closing even with a small amount of force.

7 Claims, 11 Drawing Sheets

(51) Int. Cl.
*F16H 35/10* (2006.01)
*E05B 47/00* (2006.01)
*E05B 65/10* (2006.01)
*F16H 55/22* (2006.01)

(52) U.S. Cl.
CPC ............. *E05B 65/10* (2013.01); *F16H 35/10* (2013.01); *E05B 2047/002* (2013.01); *E05B 2047/0026* (2013.01); *F16H 55/22* (2013.01)

(58) Field of Classification Search
CPC ............. Y10T 70/5416; Y10T 70/7062; Y10T 292/57; F16D 7/06; F16D 7/10; F16D 11/16; F16D 15/00; F16D 27/01; F16D 41/18; F16D 43/02; F16D 43/20; F16D 43/204; F16D 43/208; F16H 35/10; F16H 57/023
USPC ... 74/412 R, 64, 34, 89.38, 125.5, 159, 322, 74/330, 333, 345, 355, 356, 361, 368, 74/370; 192/54.52, 71, 69.62, 69.63, 192/69.91, 74, 75, 76, 77, 78, 84.1, 84.3, 192/85.13, 210, 210.1; 70/189, 190, 218, 70/277, 279.1, 280, 472; 292/32, 144, 292/201, 257, 336.3
See application file for complete search history.

(56) References Cited

U.S. PATENT DOCUMENTS

| | | | | |
|---|---|---|---|---|
| 6,516,929 | B1* | 2/2003 | Baniak | E05B 81/20 192/38 |
| 6,550,831 | B2* | 4/2003 | Rizk | E05B 79/20 292/141 |
| 7,032,937 | B2* | 4/2006 | Boecker | E05B 81/14 292/201 |
| 7,975,823 | B2* | 7/2011 | Min | E05B 47/0692 192/71 |
| 9,051,762 | B2* | 6/2015 | Huang | E05B 47/0012 |
| 9,097,037 | B2* | 8/2015 | McKibben | E05B 47/0001 |
| 2003/0209043 | A1* | 11/2003 | Yeh | E05B 47/0012 70/280 |
| 2004/0207214 | A1* | 10/2004 | Lin | E05B 47/0012 292/336.3 |
| 2005/0172685 | A1* | 8/2005 | Keightly | E05B 47/0012 70/279.1 |
| 2012/0223534 | A1 | 9/2012 | Min | |
| 2015/0285318 | A1* | 10/2015 | Lin | F16D 41/066 192/45.001 |

FOREIGN PATENT DOCUMENTS

| | | |
|---|---|---|
| KR | 10-2011-0119015 | 11/2011 |
| KR | 10-2011-0130545 | 12/2011 |

\* cited by examiner

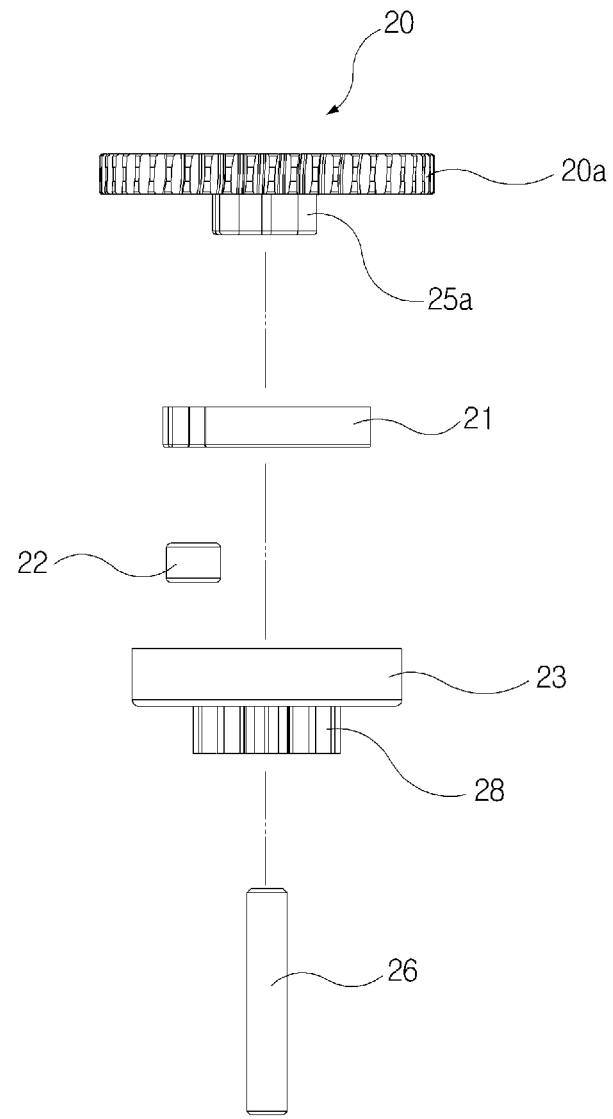

PIN CLUTCH CONNECTION STRUCTURE OF ANTI-PANIC GEAR BOX

This application is the U.S. national phase of International Application No. PCT/KR2013/004746, filed May 30, 2013, which designated the U.S. and claims priority to KR Application No. 10-2012-0103341, filed Sep. 18, 2012; and KR Application No. 10-2013-0003794, filed Jan. 14, 2013, the entire contents of each of which are hereby incorporated by reference.

TECHNICAL FIELD

The present invention relates to a pin clutch connection structure of an anti-panic gear box, and more particularly, to a pin clutch connection structure of an anti-panic gear box which is capable of preventing a driving circuit within a gear box from being damaged and enabling manual opening and closing of a door lock even with a small force.

BACKGROUND ART

In general, a gear box for use in an opening/closing structure, such as a conventional digital door lock, should transmit a rotational force to a dead bolt, which is means of opening/closing mean the digital door lock when a motor itself is rotated. However, when the dead bolt is manually operated, the rotation force should not be transmitted to the rotation shaft of the gear box in order to protect the driving circuit of the motor connected to the rotation shaft and an internal speed reduction gear accommodated in the gear box.

This function is usually called an anti-panic function, and various types of gear boxes having the anti-panic function have already been on the market. Since the anti-panic function of a gear box makes the structure of the gear box complicated, which increases costs, a gear box, which has an anti-panic function and is economic and simple in structure, is required.

In order to meet such a requirement, Korean Utility Model Registration No. 20-0452407 (entitled "Gear Box with Anti-Panic Function") discloses a gear box having an anti-panic function. The gear box having the anti-panic function prevents the rotation of a rotation shaft of the gear box when rotation force is applied from the outside so that a motor driving circuit and internal speed reduction gears accommodated in the gear box can be protected.

However, the conventional gear box has problems in that since a plurality of speed reduction gears are used for connection, a large force is needed when a user manually rotates the gear box and the gear box is complicated in structure.

DETAILED DESCRIPTION OF THE INVENTION

Technical Problem

The present invention was made in an effort to solve the problems described above, and is to provide a pin clutch connection structure of an anti-panic gear box which is capable of preventing a driving circuit within the gear box from being damaged by interrupting transmission of rotation to a driving motor provided in the gear box when the rotation force is applied from the outside (in a case of manual opening/closing of a door lock), and enabling the manual opening and closing of the door lock even with a small force.

Technical Solution

In order to achieve the above-described object, according to an aspect of the present invention, there is provided a pin clutch connection structure of an anti-panic gear box. The pin clutch connection structure includes: a first gear, wherein a manually rotatable rotation shaft is equipped at a center of the first gear; and a second gear geared with the first gear through at least one connection gear at a lower side, and geared with a driving motor at an upper side. A cam plate is mounted on the second gear, in which the cam plate includes a lower gear formed on a bottom thereof and geared with the connection gear and a plurality of recesses formed in succession along an inner peripheral surface thereof. A guide ring, which includes an opening formed in a side portion thereof, is inserted into the cam plate, and a pin is installed to be moved between the opening of the guide ring and the recesses, and a rotation cam is fixed inside the guide ring coaxially with the second gear through the shaft so that when the second gear is rotated, the rotation cam is rotated together with the second gear to cause the pin to be seated in one of the recesses so as to form a clutch on state so that the lower gear of the cam plate is rotated, and when rotation force is transmitted to the lower gear, the pin is released along an inner peripheral surface of the recess formed on the inner peripheral surface of the cam plate to form a clutch off state so that the rotation force is prevented from being transmitted to the second gear.

According to another aspect of the present invention, there is provided a pin clutch connection structure of an anti-panic gear box which prevents rotation force transmitted from a manually operated rotation shaft from being transmitted to a driving motor. The pin clutch connection structure includes: an upper gear geared with the driving motor; a cam plate mounted on a bottom of the upper gear, and including a lower gear formed on a bottom thereof and recesses formed in succession on an inner peripheral surface thereof; a guide ring mounted inside the cam plate and including an opening formed in a side portion thereof; a pin mounted to be movable between the opening of the guide ring and the recesses; and a rotation cam mounted inside the cam plate and rotated together with the upper gear and fixed to the upper gear through a shaft to be rotated together with the upper gear. The rotation cam has a cam face formed in a streamlined shape so that when the rotation cam is rotated in one direction, the pin is introduced into a recess among the recesses to be in a restrained state, and when the rotation cam is rotated in an opposite direction, the restrained state of the pin is released.

The pin may be formed of a magnetic material so that an attractive force acts between the pin and the shaft, thereby reliably determining the moving position of the pin.

Advantageous Effects

According to the present invention, when rotation force is transmitted to the inside of the gear box through an external handle shaft, a knob, or the like (i.e., when the door lock is manually opened/closed), the transmission of the rotation to the driving motor provided in the gear box is interrupted so that the driving circuit within the gear box can be prevented from being damaged and the gear box can be manually opened/closed with small force.

BRIEF DESCRIPTION OF THE DRAWINGS

FIG. 6 is a side view of FIG. 5;

MODE FOR CARRYING OUT THE INVENTION

Hereinafter, embodiments of the present embodiment will be described in detail with reference to accompanying illustrative drawings. Prior to description, it shall be noted that in the following description of the present invention, the terms used to refer to components of the present invention are defined in consideration of the functions of respective components, and thus, shall not be understood in a meaning of limiting the technical components of the present invention.

Figure 1:
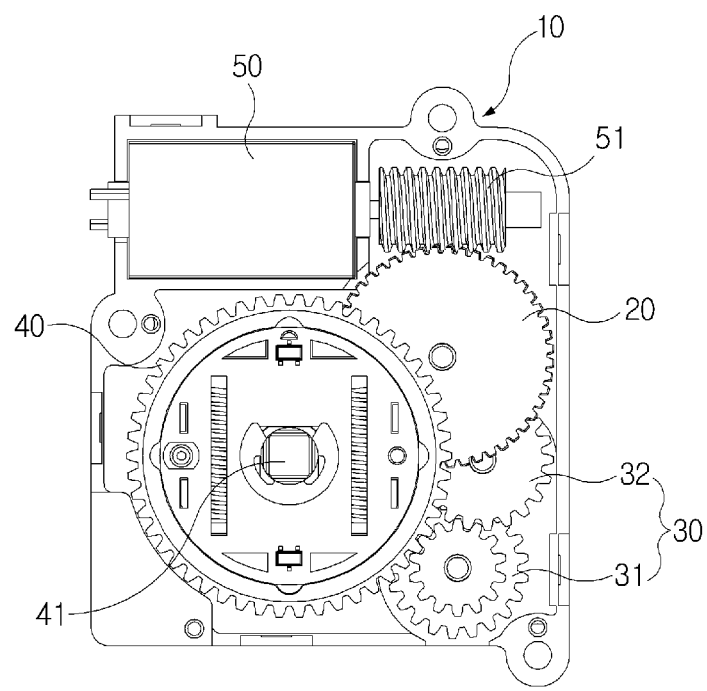
FIG. 1 is a plan view illustrating a configuration of a pin clutch connection structure of an anti-panic gear box according to one embodiment of the present invention.
Figure 2:
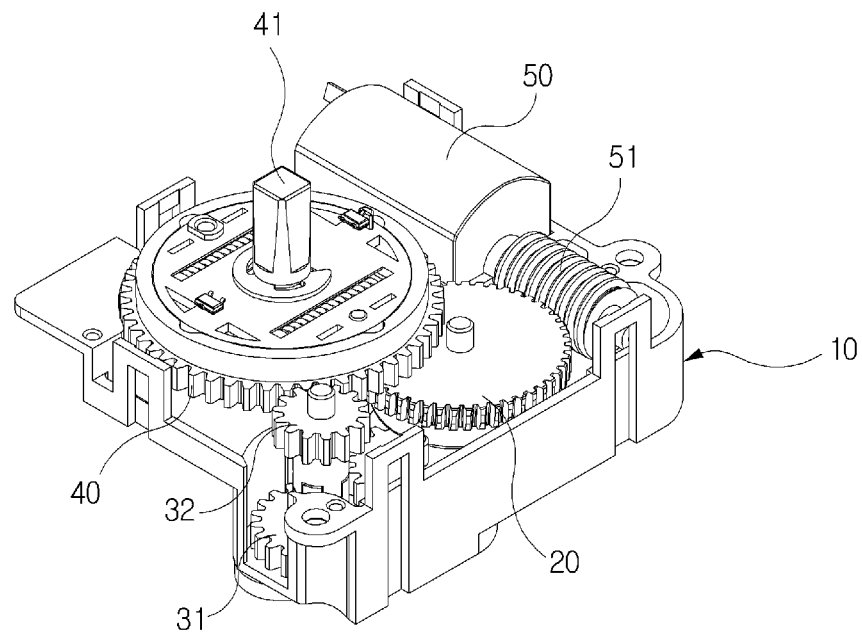
FIG. 2 is a partial perspective view illustrating the configuration of the pin clutch connection structure of the anti-panic gear box according to the embodiment of the present invention.
Figure 3:
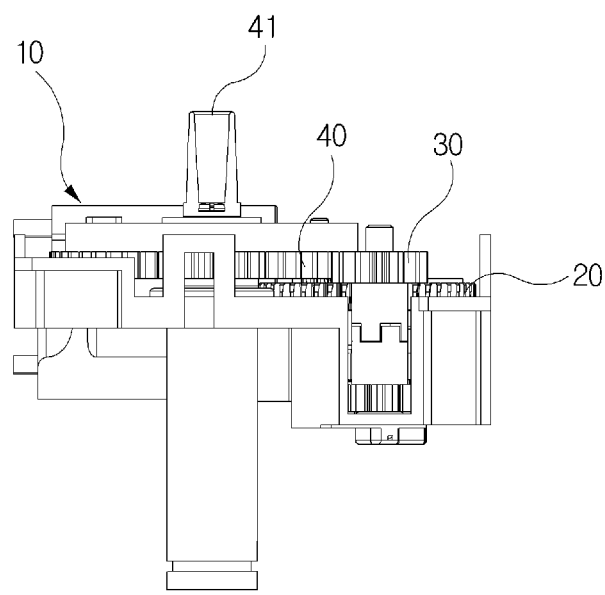
FIG. 3 is a side view illustrating the configuration of the pin clutch connection structure of the anti-panic gear box according to the embodiment of the present invention.

As illustrated in FIGS. 1 to 3, a pin clutch connection structure of an anti-panic gear box according to one embodiment of the present invention has a configuration in which a driving motor 50, a first gear 40, a second gear 20, and a plurality of connection gears 30 (31 and 32) are equipped in a gear box body 10.

Specifically, a moving screw 51 is connected to the driving motor 50 to be capable of being rotated by the rotation force of the driving motor 50. In addition, the moving screw 51 is geared with the second gear 20 (connected in orthogonal directions like a worm gear). Thus, when the driving motor 50 is driven to rotate the moving screw 51, the second gear 20 may be rotated (transmission of a rotation force like a worm gear).

Meanwhile, a rotation shaft 41 is equipped at the center of the first gear 40. The rotation shaft 41 is connected with a handle shaft (not illustrated) or a knob of a door lock body (not illustrated) so that a user may perform manual driving (rotation) by rotating the handle or the knob.

Meanwhile, the first gear 40 and the second gear 20 are connected with each other through the plurality of connection gears 30 to be rotated in a predetermined speed reduction ratio. Specifically, the first gear 40 and the second gear 20 are interlocked with each other via the first connection gear 31 and the second connection gear 32, rather than being directly connected with each other.

In this way, the gear box body 10 is configured such that the first gear 40, which is driven by a rotation force manually transmitted through the handle or the knob, and the second gear 20, which is automatically driven by the driving motor 50, are geared with each other via the plurality of connection gears 30.

Figure 4:
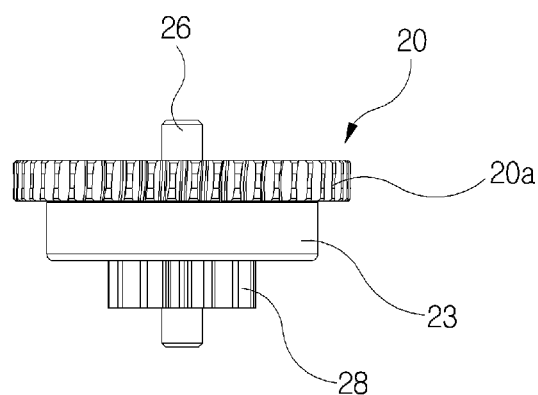
FIG. 4 is a side view illustrating a second gear assembly, which is a component of the pin clutch connection structure of the anti-panic gear box according to the embodiment of the present invention.
Figure 5:
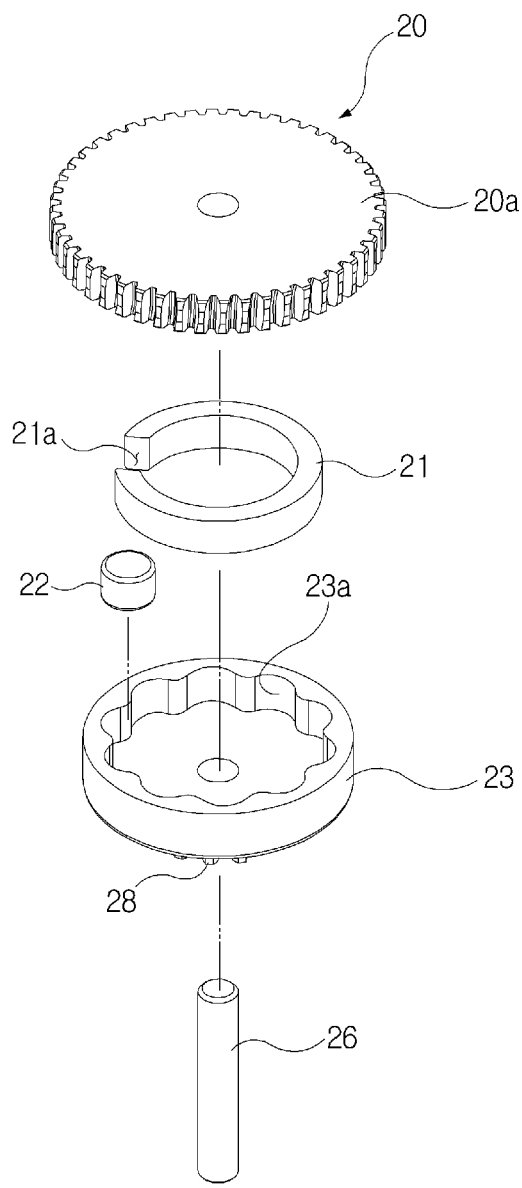
FIG. 5 is an exploded perspective view illustrating a second gear assembly, which is a component of the pin clutch connection structure of the anti-panic gear box according to the embodiment of the present invention.

As illustrated in FIGS. 4 to 6, the present invention has a configuration including a clutch element mounted inside the second gear 20. Specifically, a cam plate 23 having a lower gear 28 formed on the bottom thereof is mounted below an upper gear 20a. On the inner surface of the cam plate 23, recesses 23a are formed in succession. The recesses 23a may be formed such that each recess has a radius to allow a pin 22 to be selectively introduced into the recess 23a. In addition, a guide ring 21 having an opening 21a formed in a side portion thereof is mounted within the cam plate 23.

As described above, the guide ring 21 is mounted within the cam plate 23, and the pin 22 is positioned between the opening 21a formed in the guide ring 21 and the recesses 23a formed inside the cam plate 23 to be moved between the opening 21a and the recesses 23a. Meanwhile, a rotation cam 25a is positioned inside the guide ring 21 to move the pin 22 while the rotation cam 25a is rotated, in which the rotation cam 25a is coaxially connected with the upper gear 20a through a shaft 26 so that when the upper gear 20a is rotated, the lower rotation cam 25a may also rotated. Here, the rotation cam 25a may be configured in a structure integrally formed on the bottom of the upper gear 20a, as illustrated in FIG. 6.

More specifically, the rotation cam 25a includes a cam face 27 formed in a streamlined shape, and seating recesses 26a and 26b formed on opposite sides of the apex of the cam face 27, and is configured such that when the rotation cam 25a is rotated in one direction, the pin 22 moves along the cam face 27 and is introduced into a recess 23a to be in a restrained state, and when the rotation cam 25a is rotated in the opposite direction, or the cam plate 23 is rotated in the state where the rotation cam 25a is stopped, the restrained state of the pin 22 is released so that the pin 22 is released from the recess 23a.

Figure 7A:
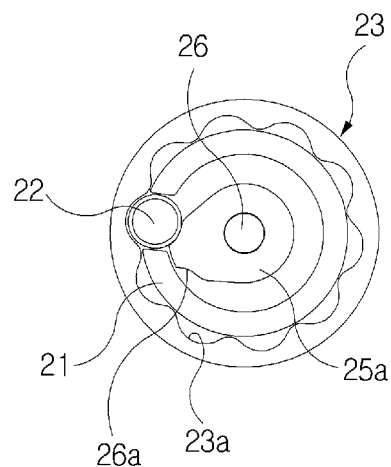
FIG. 7a is a plan view illustrating a clutch on state of a pin clutch connection structure of an anti-panic gear box according to one embodiment of the present invention.

As illustrated in FIG. 7a, when the upper gear 20a rotates clockwise, the pin 22 moving along the outer periphery of the rotation cam 25a is introduced into the recess 23a of the cam plate 23, thereby being restrained. The pin 22 is fixed between the recess 23a of the cam plate 23 and the rotation cam 25a, and at this time, the pin 22 is guided to the opening 21a of the guide ring 21 so that the cam plate 23 can be smoothly rotated clockwise. That is, when the upper gear 20a rotates, the lower rotation cam 25a also rotates to move the pin 22 to the recess 23a so that the rotation cam 25a and the cam plate 23 can be rotated together with the pin 22 interposed therebetween. Thus, the lower gear 28 formed on the bottom of the cam plate 23 is also rotated therewith. Consequently, the rotation force of the lower gear 28 is transmitted through the connection gears 30 to rotate the first gear 40, thereby moving the dead bolt interlocked with the rotation shaft 41 of the first gear 40 to an unlocked state. Thus, the door lock can be unlocked.

Figure 8A:
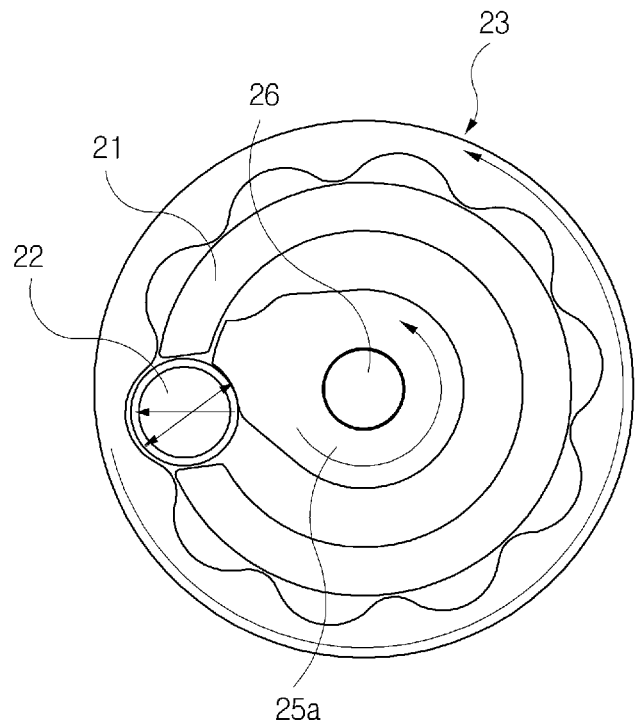
FIG. 8a is a state view illustrating operating directions of respective components in the clutch on state of the pin clutch connection structure of the anti-panic gear box according to the embodiment of the present invention.

Referring to FIG. 8a, when the driving motor 50 is driven to rotate the moving screw 51 as illustrated in FIG. 2, the second gear 20 is rotated counterclockwise (FIG. 8a illustrates clutch connection in the counterclockwise direction). Accordingly, the upper gear 20a of the second gear 20 is rotated, and the rotation cam 25a positioned inside the cam plate 23 is rotated counterclockwise via the shaft 26 so that counterclockwise rotation is performed in the state where the pin 22 is positioned in the recess 23a (see FIG. 7a). As a result, the counterclockwise movement of the rotation cam 25a rotates the lower gear 28 formed on the bottom of the cam plate 23 so that the first gear 40 can be rotated through the connection gears 30 connected to the lower gear 28 (that is, a clutch on state is obtained). Accordingly, the dead bolt of the door lock, which is interlocked with the rotation shaft 41 of the first gear 40, is operated so that the door lock can be unlocked (automatic unlocking using the driving motor). In this manner, the locked state (the rotation direction of the rotation cam is set to the opposite direction) can be obtained.

Figure 7B:
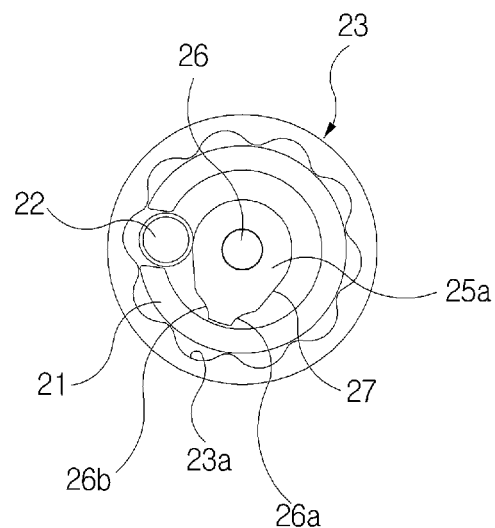
FIG. 7b is a plan view illustrating a clutch off state of the pin clutch connection structure of the anti-panic gear box according to the embodiment of the present invention.
Figure 8B:
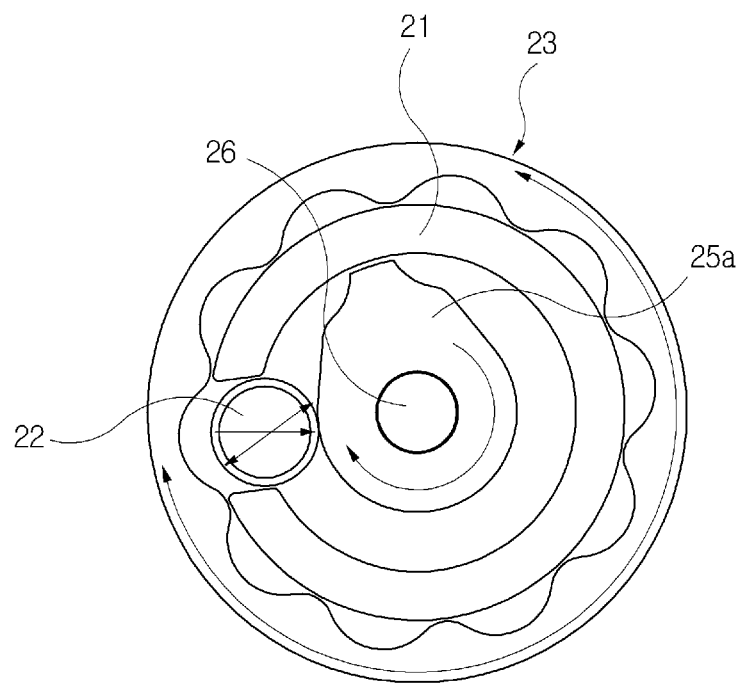
FIG. 8b is a state view illustrating operating directions of respective components in the clutch off state of the pin clutch connection structure of the anti-panic gear box according to the embodiment of the present invention.

Meanwhile, as illustrated in FIGS. 7b and 8b, when rotation is transmitted to the lower gear 28 of the cam plate 23 (that is, when the first gear is manually rotated), the rotation cam 25a is not interlocked therewith within the cam plate 23 and thus, only the cam plate 23 is rotated. Thus, the pin 22 is released along the curve of the recess 23a of the inner peripheral surface (in the state freely movable from the guide ring) so that the cam plate 23 is freely movable in any of left and right directions (that is, the clutch off state is obtained). At this time, preferably after the rotation cam 25a is rotated in one direction for locking or unlocking by the driving motor 50 in the state where the rotation cam 25a is in the clutch on state, the rotation cam 25a is reversely rotated by a predetermined angle in the direction opposite to the rotated direction by the driving motor 50, so that the pin 22 may be guided to be freely moved long the cam face 27 of the rotation cam 25a (guiding the clutch off state), as illustrated in FIG. 8b. That is, by reversely rotating the rotation cam 25a again by a predetermined angle in the opposite direction from the actuation completing point of the rotation cam 25a in the clutch on state, the clutch off state can be reliably obtained. It is preferably assured that the pin 22 can be reliably released from the recess 23a by forming the pin 22 of a magnetic material so that attractive force acts on the shaft 26. That is, when the pin 22 is made of the magnetic material, the attractive force from the pin 22 acts on the shaft 26 formed of iron so that at the time of clutch off, the pin 22 is in close contact with the rotation cam 25a. Through this, a reliable clutch off state can be achieved, and thus, operation reliability can be improved.

Accordingly, even if the first gear 40 is manually rotated at the outside, and thus, the rotation force is transmitted through the connection gears 30 to rotate the lower gear 28, restraint force does not acts on the pin 22 within the cam plate 23 and thus, the upper gear 20a is not rotated with the lower gear 28. Thus, the driving motor 50 can be prevented from being forcibly rotated by the rotation transmitted from the outside so that the driving circuit can be prevented from being damaged, and the door lock can be unlocked even with small force (at the time of manual unlocking, the rotation force transmitted to the driving motor is interrupted so as to facilitate rotation).

Figure 9:
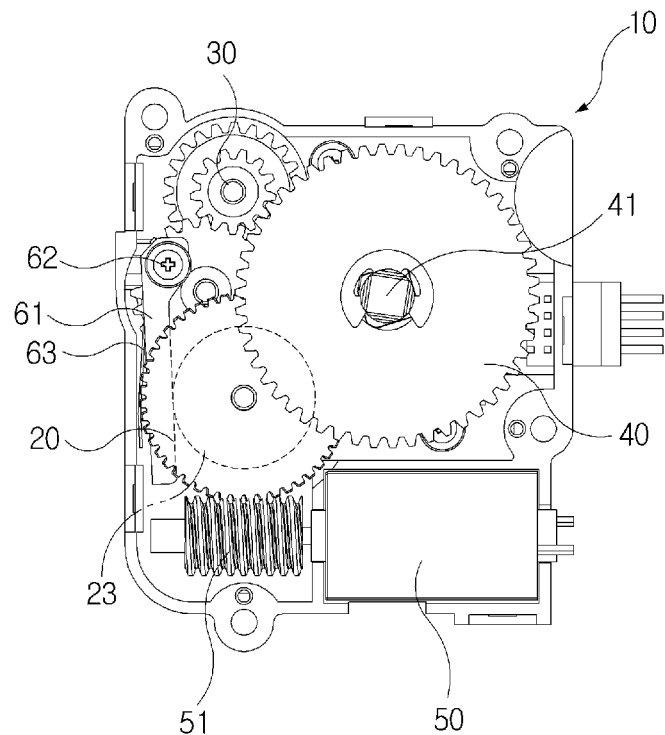
FIG. 9 is a view exemplifying an example of a frictional support member of a pin clutch connection structure of an anti-panic gear box according to one embodiment of the present invention.
Figure 10:
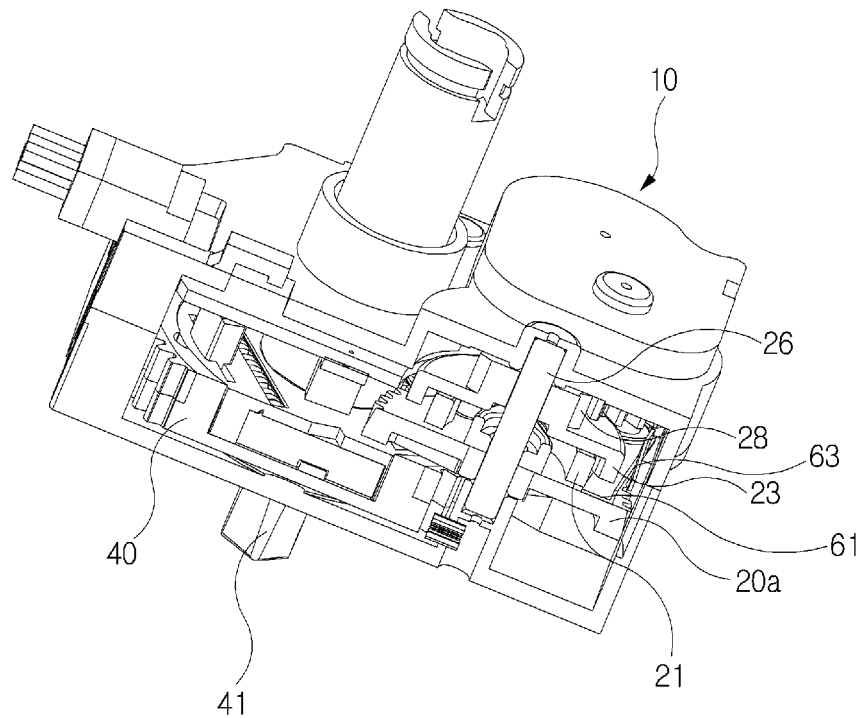
FIG. 10 is a perspective view illustrating an internal configuration of an example of a frictional support member of a pin clutch connection structure of an anti-panic gear box according to another embodiment of the present invention.
Figure 11:
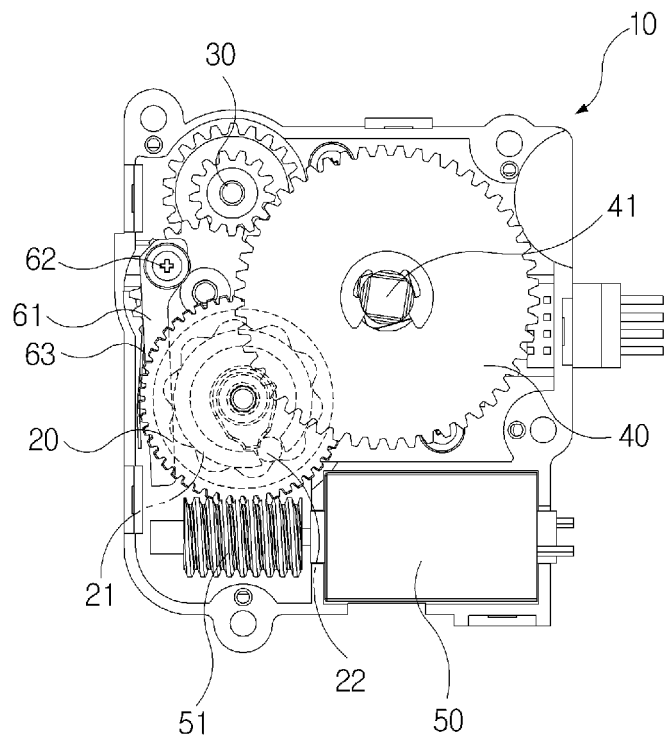
FIG. 11 is a plan view exemplifying a frictional support member of a pin clutch connection structure of an anti-panic gear box according to another embodiment of the present invention.
Figure 12:
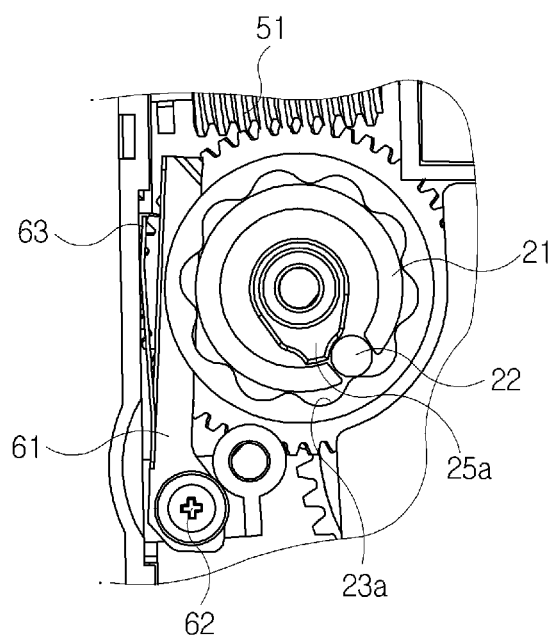
FIG. 12 is a view illustrating a part of a frictional support member of a pin clutch connection structure of an anti-panic gear box according to another embodiment of the present invention in detail.
Figure 13:
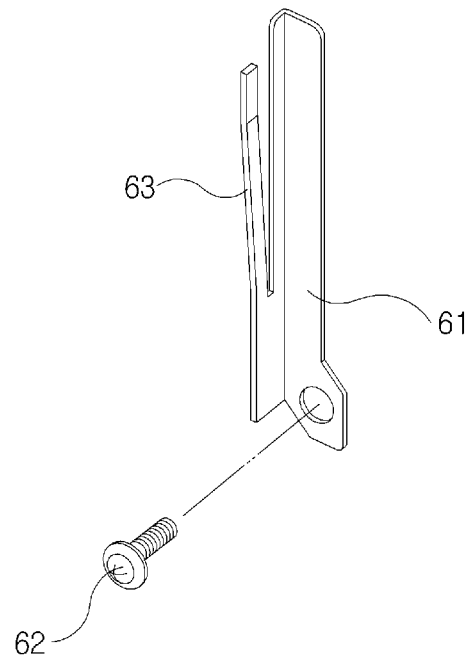
FIG. 13 is a perspective view illustrating a frictional support member of a pin clutch connection structure of an anti-panic gear box according to another embodiment of the present invention.

As illustrated in FIG. 9, the gear box body 10 may be provided with a frictional support member that provides close contact force to the outer peripheral surface of the cam plate 23 of the second gear 20.

Specifically, in the clutch off state of the second gear 20 (that is, in the state where the pin 22 is released from the recess 23a of the cam plate 23) as illustrated in FIG. 8b, the cam plate 23 is in an idling state (in a state where the cam plate 23 is rotatable left and right). At this time, even if the upper gear 20a is rotated, and thus, the rotation cam 25a is rotated, the guide ring 21 within the cam plate 23 can be prevented from being moved due to the friction with the inner surface of the cam plate 23.

For this purpose, a support piece 61, which is in close contact with the outer surface of the cam plate 23 by a leaf spring 63, is provided in the gear box body 10. At this time, one end of the support piece 61 is fixed by an anchor (e.g., a screw 62) so that the other end may be rotated with a predetermined radius. In addition, the leaf spring 63 mounted at one side of the other end serves to cause the support piece 61 to be in close contact with the cam plate 23.

When the rotation force transmitted through the external handle shaft, the knob or the like to the first gear 40 is prevented from being directly transmitted to the driving motor 50 within the gear box as described above, the driving circuit within the gear box can be prevented from being damaged and manual opening/closing can be performed with small force.

As illustrated in FIGS. 10 to 13, the frictional support member may be inserted into a gap (see FIG. 10) formed between the cam plate 23 and the upper gear 20a to provide frictional force to the guide ring 21. At this time, the frictional support member is installed to be supported by the anchor 62 at one side thereof and to be rotated about the anchor 62 as illustrated in FIG. 9, and at one side of the frictional support member, the leaf spring 63 may be provided as a structure elastically supported within the gear box body 10 by being bifurcated (see FIGS. 12 and 13).

In this way, the spring 63 formed on the support piece 61 prevents the support piece 61 from being rotated according to the rotation of the cam plate 23 in the idling state of the guide ring 21 (i.e., in the state where the guide ring 21 is freely rotatable as the pin 22 is released from the recess 23a) as the support piece 61 is in close contact with the outer surface of the guide ring 21.

That is, in the idling state of the guide ring 21, the pin 22 may be prevented from being undesirably introduced into the recess 23a as the guide ring 21 is rotated together with the cam plate 23, thereby preventing poor operation from being caused.

Figure 14:
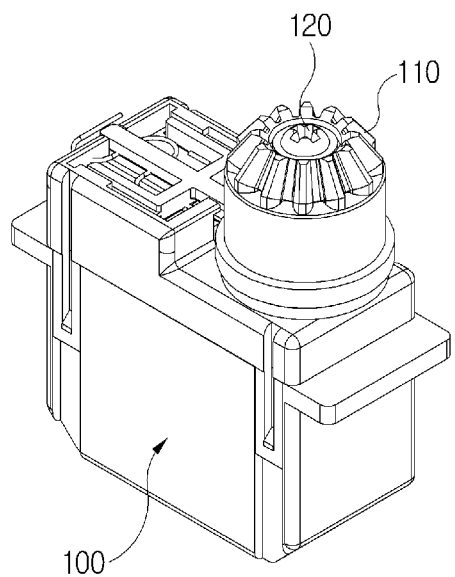
FIG. 14 is a perspective view illustrating an anti-panic gear box, to which a pin clutch connection structure of an anti-panic gear box according to still another embodiment of the present invention.
Figure 15:
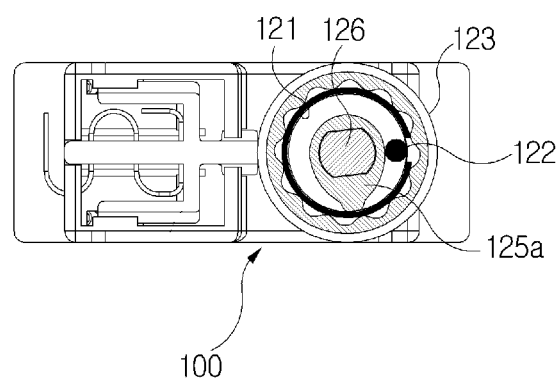
FIG. 15 is a horizontal cross-sectional view illustrating an anti-panic gear box, to which a pin clutch connection structure of an anti-panic gear box according to still another embodiment of the present invention.

As illustrated in FIGS. 14 and 15, the pin clutch connection structure of the present invention may be applied to an anti-panic gear box, of which the type is different from the above-described embodiment. For example, the pin clutch connection structure may be applied to, for example, the anti-panic gear box disclosed in Korean Utility Model Application 2012-0006476 (entitled "Clutch Connection Structure of Gear Box of Anti-panic Structure; hereinafter, referred to as a "invention of prior application").

That is, the invention of prior application has a structure in which a gear box body 100 is equipped with a motor, and a driven gear 110 engaged with a driving shaft 120 is rotated by the driving of the motor, thereby driving a rotation body within a mortise. Thus, the clutch connection structure of the present invention may be applied to the inside of the driven gear 110 as described above. The clutch operation state of the clutch connection structure of the present invention is the same as that of the above-described embodiment. Hereinafter, the clutch operation state will be briefly described.

As illustrated in FIGS. 14 and 15, a shaft 126 engaged with the driving motor of the gear box body 100 is connected with a rotation cam 125a, and like the operation of the above-described embodiment, the rotation cam 125a moves a pin 122 along a guide ring 121 to be introduced into a seating groove (no reference numeral is given) of a cam plate 123, thereby achieving a clutch on state, and when the cam plate 123 is rotated, the pin 122 is released from the state where it is fixed with the rotation cam 125a, thereby achieving a clutch off state.

With this operation, the clutch on/off state can be reliably achieved, thereby preventing the driving motor applied to a conventional gear box of a different type from being damaged by being forcibly rotated by external force.

Although a specific embodiment of the present invention has been illustrated and described, the present invention is not limited to the embodiment, but it will be appreciated by those skilled in the art to which the present invention pertains that the present invention can be variously modified without departing from the spirit of the present invention which is claimed in the claims.

The invention claimed is:

1. A pin clutch connection structure of an anti-panic gear box, which prevents a rotation force that is transmitted from a manually operated rotation shaft, from being transmitted to a driving motor, the pin clutch connection structure comprising:
    an upper gear geared with the driving motor;
    a cam plate mounted on a bottom of the upper gear, and including a lower gear formed on a bottom thereof and recesses formed in succession on an inner peripheral surface thereof;
    a guide ring mounted inside the cam plate and including an opening formed in a side portion thereof;
    a movable, pin mounted to move between the opening of the guide ring and the recesses; and
    a rotation cam mounted inside the cam plate and rotated together with the upper gear,
    wherein the upper gear and the cam plate are spaced apart from each other, and
    the pin clutch connection structure further comprises a frictional support member inserted into a space formed between the upper gear and the cam plate to provide frictional force to prevent free rotation of the guide ring, and
    the frictional support member comprises a support piece rotatably supported at one end, and a leaf spring bifurcated to a side from the support piece to press the support piece in one direction.

2. The pin clutch connection structure of claim 1, wherein the rotation cam is coaxially connected with the upper gear with a shaft, such that said cam may be rotated together with the upper gear, and has a cam face formed in a streamlined shape so that when the rotation cam is rotated in one direction, the pin is introduced into a recess among the recesses in a restrained state, and when the rotation cam is rotated in an opposite direction, the restrained state of the pin is released.

3. The pin clutch connection structure of claim 2, wherein at least one seating recess is formed at an apex of the cam face so that when the rotation cam is moved, the pin is seated in the seating recess.

4. The pin clutch connection structure of claim 2, wherein the pin is formed of a magnetic material such that attractive force acts between the pin and the shaft.

5. The pin clutch connection structure of claim 2, wherein the rotation cam is rotated in one direction, and then reversely rotated in a direction opposite to the rotated direction by a predetermined angle by the driving motor.

6. The pin clutch connection structure of claim 1, wherein the rotation cam is rotated in one direction, and then reversely rotated in a direction opposite to the rotated direction by a predetermined angle by the driving motor.

7. The pin clutch connection structure of claim 1, wherein the support piece contacts the guide ring.

* * * * *